United States Patent [19]
Sutterlin et al.

[11] Patent Number: 5,942,814
[45] Date of Patent: *Aug. 24, 1999

[54] MODULE FOR CONTROLLING CURRENT TO A LOAD INCLUDING SENSING OF THE POSITION OF A SWITCH

[75] Inventors: Philip H. Sutterlin, Saratoga; Reza S. Raji, Palo Alto; Michael R. Tennefoss, Portola Valley, all of Calif.

[73] Assignee: Echelon Corporation, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,342
[22] Filed: Apr. 28, 1997
[51] Int. Cl.[6] ........................ H01H 47/00; H04M 11/04
[52] U.S. Cl. .................. 307/125; 307/140; 340/310.01
[58] Field of Search ................................ 307/112, 173, 307/116, 125, 139, 140, 141.4, 141; 340/310.01, 310.02, 310.08

[56] References Cited

U.S. PATENT DOCUMENTS

| | | |
|---|---|---|
| 4,418,333 | 11/1983 | Schwarzbach et al. ........... 340/310.01 |
| 4,471,232 | 9/1984 | Peddie et al. ................. 307/35 |
| 4,782,420 | 11/1988 | Holdgaard-Jensen ............ 361/58 |
| 4,918,690 | 4/1990 | Markkula et al. ............. 370/94 |
| 5,471,190 | 11/1995 | Zimmerman .................. 340/310.01 |

OTHER PUBLICATIONS

"PLT–21 Power Line Transceiver User's Guide", Version 2, Echelon Corporation, 1996.

*Primary Examiner*—Jeffrey Gaffin
*Assistant Examiner*—Jonathan S Kaplan
*Attorney, Agent, or Firm*—Blakely, Sokoloff, Taylor & Zafman, LLP

[57] ABSTRACT

A module for interconnecting an AC power line to a load such as a lamp, which includes a first switch. The module detects the state of the first switch and then provides power to the load when the switch is closed. Sequentially opening and closing the first switch can be used as a command to dim the lamp. The module may also include a transceiver which communicates the state of the switch to the other modules thereby allowing a plurality of devices to be controlled by the first switch.

5 Claims, 3 Drawing Sheets

MODULE FOR CONTROLLING CURRENT TO A LOAD INCLUDING SENSING OF THE POSITION OF A SWITCH

BACKGROUND OF THE INVENTION

1. Field of the Invention

The invention relates to the field of modules for use in networks which control the operation of devices connected to the network.

2. Prior Art

Numerous networks are known for controlling devices such as appliances, machinery, lighting, etc., connected to the network. Signals between the devices are transmitted over lines such as twisted pair lines, power lines or through radio frequency (RF) or infrared (IR) links. One such system is sold by Echelon Corporation under the trademark LONWORKS®. This system is described in part in U.S. Pat. No. 4,918,690. Another system is described in U.S. Pat. No. 5,471,190. Still another communication system is known as "X10", is manufactured by X10 USA, Ltd.

For the most part, such as shown in FIG. 1 of U.S. Pat. No. 4,918,690 and FIG. 2 of U.S. Pat. 5,471,190, the position of a first switch connected to a circuit is sensed and the state of the switch is used to control an electronic switch connected in series with a load, such as a lamp. The first switch is not in the path that includes the load.

As will be seen, the present invention departs from this arrangement by sensing the position of a first switch which is in series with the load and then uses the state of this switch to control current through the load as well as current through other remotely located loads.

SUMMARY OF THE INVENTION

A module for interconnecting between an alternating current (AC) source and an electrical load having a first switch connected in series and associated with the load is described. An electrically controlled switching device is included within the module to control the flow of AC from the source through the load and first switch. The switching device is controlled by a control circuit. The control circuit is coupled to a sensing circuit which senses the state of the first switch. When the state of the first switch is changed, for instance closed, the sensing circuit senses this change and causes the switching device to allow an AC to flow through the first switch and load. This seemingly redundant act of the switching device is put to good use as will be seen.

In one embodiment, a message indicating the state of the switch is coupled onto the AC power network through a transceiver, allowing other electrically controlled switches to be activated in modules associated with other loads.

DETAILED DESCRIPTION OF THE PRESENT INVENTION

A module for controlling the flow of power, particularly alternating current (AC) is described. In the following description numerous specific details are set forth, such as a specific power supply. It will be apparent to one skilled in the art that the present invention may be practiced without these details. In other instances, well-known circuits such as transceivers, have not been described in detail in order not to obscure the present invention.

Figure 1:
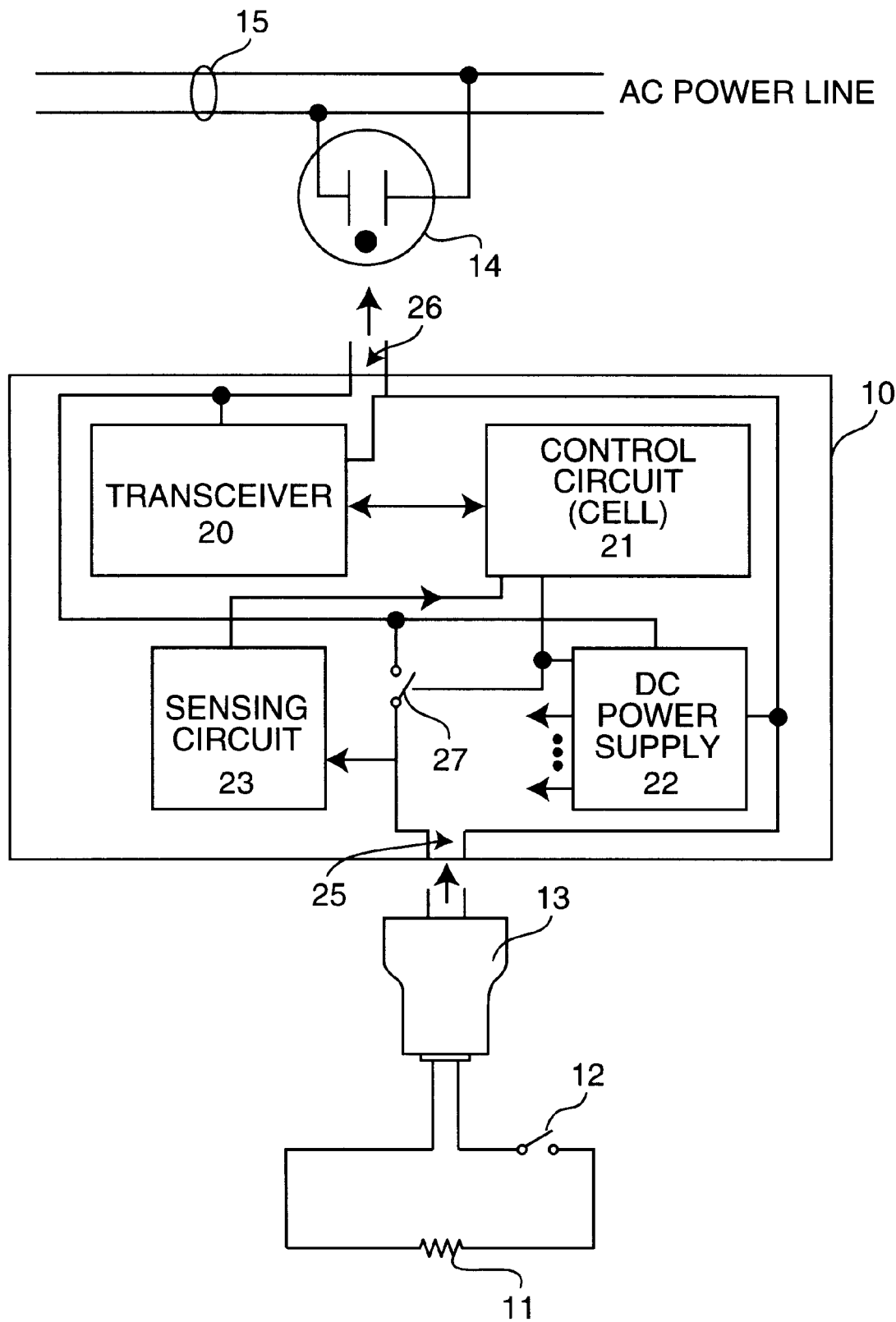
FIG. 1 is a block diagram of a module in accordance with the present invention. This figure also shows the modules coupling between power lines and a load.

Module of FIG. 1

In FIG. 1, the module 10 is shown in an embodiment compatible with 110 volt, 60 cycle alternating current as used in the United States. The module is used between AC power lines 15 and a load 11. The prongs 26 of a standard AC plug attached to the module 10 are inserted into a receptacle 14. The receptacle receives power from AC power lines 15.

The load 11 is connected in series with a first switch 12 associated with the load and these components are connected to a plug 13. The plug 13 cooperatively engages a receptacle 25 of the module 10. The first switch may be a manual switch, a switch indirectly controlled by another device such as a remote control, photocell, etc., or other switch in series with the load.

The module itself includes, in one embodiment, a transceiver 20 which transmits and receives control signals, on to and from, the power lines 15 and which provides and receives signals to and from the control circuit 21. The control circuit 21 provides signals for controlling an electrically controllable switch 27. Switch 27, when closed, allows current to flow from the power line 15 to the load 11, provided switch 12 is closed.

Sensing circuit 23 senses the position of the first switch 12 and provides signals representative of switch 12's state (i.e., opened or closed) to the control circuit 21. In one embodiment there is leakage associated with the switch circuit which is used to aid in the sensing.

A DC power supply 22 receives AC power from the lines 15 and provides DC power to the transceiver 20, control circuit 21 and may provide power to the sensing circuit 23 where needed. Additionally, DC power may be used by the control circuit and/or switch 27, as will be shown in connection with FIG. 4, where the switch 27 is a triac.

In operation, the sensing circuit 23 senses the state of the switch 12. When it senses that the state of first switch 12 has changed, for instance, for a two position switch, that the switch has been closed, it provides a signal to the control circuit 21 which in turn closes switch 27 allowing current to flow through the load 11. Note that in the arrangement of FIG. 1, the state of a first switch is being sensed and that switch is connected in series with the load. This allows, for instance, appliances, lamps and many other electrical devices used in both home and business having first switches to be connected into a network for remote sensing and control without any rewiring and without the need for additional first switches.

Looked at another way, the first switch which normally turns on and off a load such as a lamp, can be used more versatilely. For example, once the switch 12 is closed and the lamp is on, the control circuit 21 can be programmed to recognize the opening and closing of switch 12 occurring in some period of time; say two seconds. This opening and closing of the switch 12 can be detected as a command and used by the control circuit to, for instance, dim the lamp. Or, the sequential (i.e., successive) opening and closing of the first switch can sequentially select varying levels of intensity. Thus an ordinary switch connected to an ordinary light bulb can cause the light bulb to have the functions of a three-way or n-way bulb.

Figure 2:
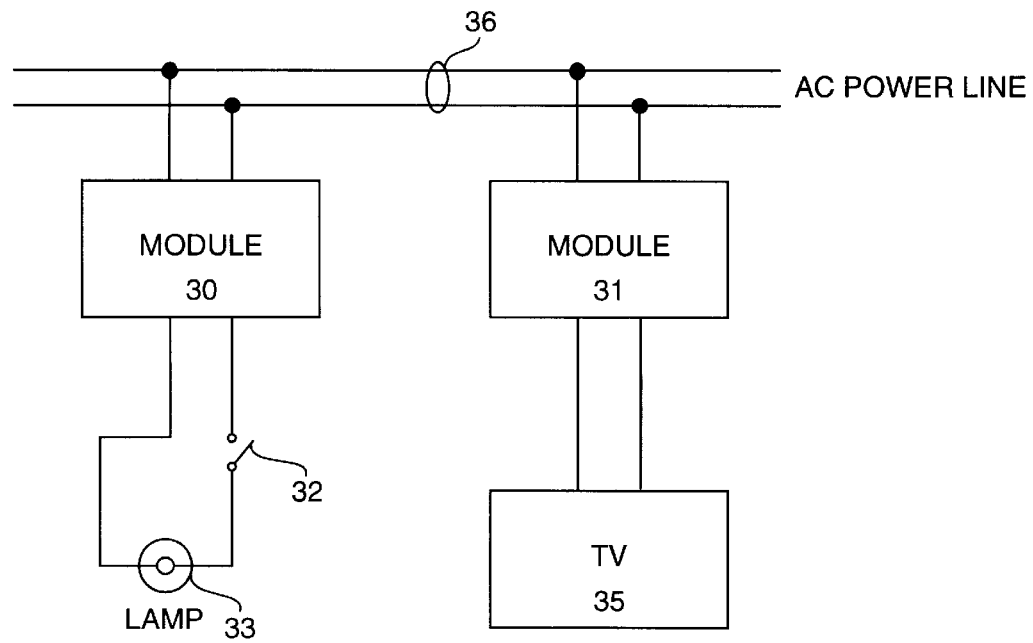
FIG. 2 illustrates the use of two modules in a network.

Additionally, referring now to FIG. 2, the first switch can be used to control other electrical items. In FIG. 2, two modules 30 and 31 each of which may be the same as module 10 of FIG. 1 are shown. The module 30 connects the power lines 36 to a lamp 33 through a first switch 32. The module 31 connects the power lines 36 to a television 35. When the switch 32 is closed and the lamp 33 lights, the transceiver within the module 30 can send a signal to the transceiver in the module 31 causing module 31 to supply current to the television 35 or other appliance. Thus, turning on and off the lamp 32 can activate a remotely located electrical device. Or for instance, the module 30 can be programmed to send a signal to module 31 only when lamp 33 is dimmed, thus the television 35 is turned on only when the lamp 33 is dimmed. Alternatively, the activation of the TV can be sensed in module 31 and cause lamp 33 to dim if switch 32 is closed. In another example, when the switch 32 is closed, it could activate other modules so that other lamps are turned on. Similarly, when dimming occurs through switch 32, this could dim the lights associated with the other modules and also at the same time turn on the television 35. Still alternatively, a control timer associated with one load can cause action in other modules. Numerous other possibilities and combinations can be achieved with the modules.

Figure 4:
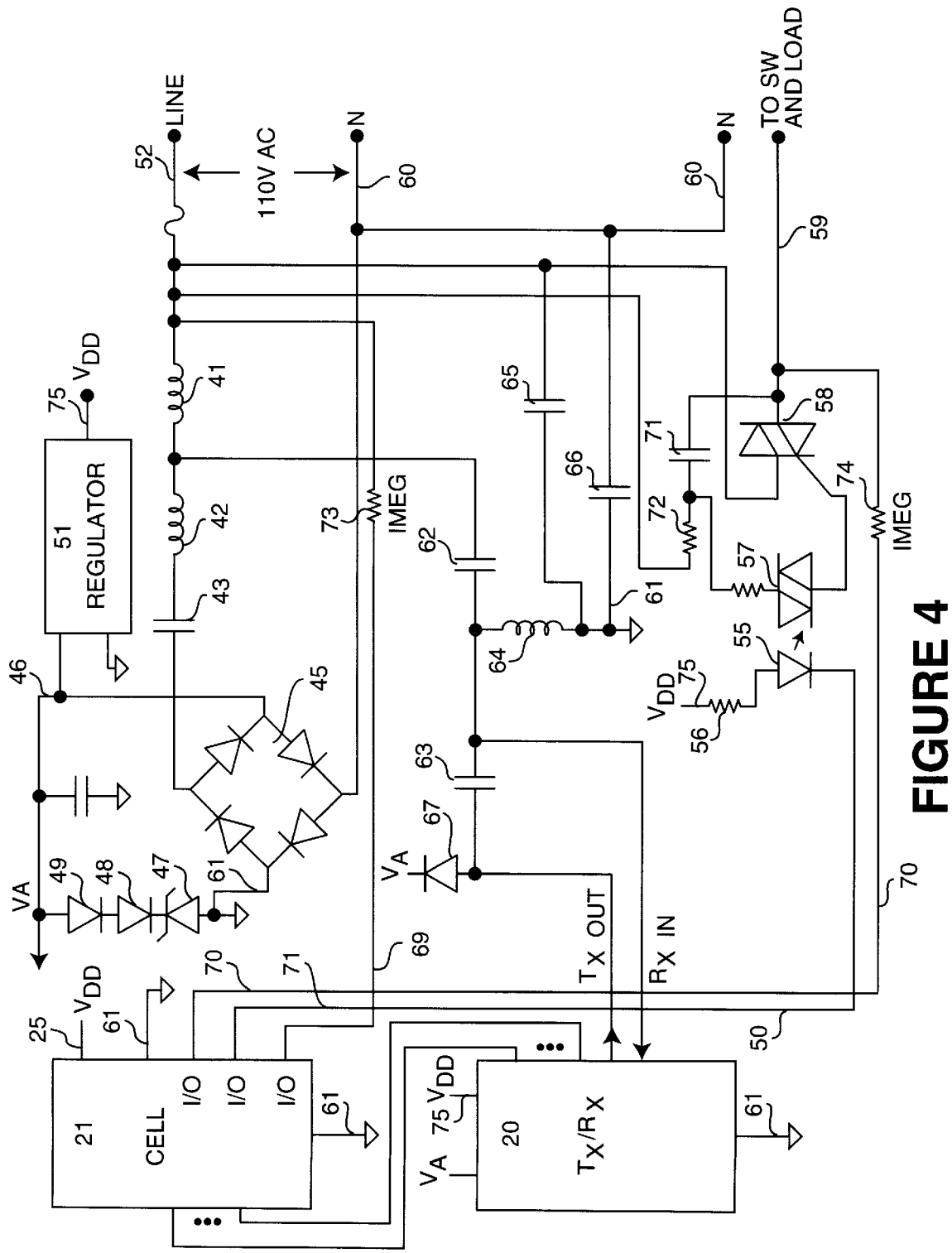
FIG. 4 is an electrical schematic of a power supply which includes a sensing circuit.

Embodiment of FIG. 4

FIG. 4 illustrates, in part, a prior art power supply for providing DC power ($V_A$ and $V_{DD}$) to the transceiver 20 and cell 21 and for the control lead of a triac. Additionally, the circuit of FIG. 4 provides the sensing performed by the sensing circuit 23 of FIG. 1.

The power supply is coupled between lines 52 and 60, the AC source. Line 52 is coupled through inductors 41 and 42 and capacitor 43 to a diode bridge 45. The diode bridge is also connected to the neutral line 60. The output of the diode bridge, line 46, is the positive potential ($V_A$) and line 61 is the power supply common connection. The power supply common connection 61 is not fixed with respect to the neutral line 60 because of the full wave diode bridge 45.

$V_A$ is regulated by the zener diode 47. This diode is coupled in series with diodes 48 and 49. The diodes 48 and 49 are thermally coupled to the diode 47 such that their temperature is approximately equal to the temperature of the diode 47. This provides temperature compensation for the potential $V_A$. $V_A$ is also used to power a linear regulator 51. The output of the supply 51, for the embodiment illustrated, is +5V on line 75 ($V_{DD}$). The potential $V_A$ also powers transmit and receive circuitry of the transceiver 20.

The line 52 is coupled through the main terminals 58 of a triac to line 59. This line along with line 60 are coupled for example, to the first switch 12 and load 11 of FIG. 1. The optically coupled triac (comprising 55 and 57) is controlled through the light emitting diode 55 which receives current from line 75 through the resistor 56. A low potential coupled over line 50 to the diode 55 causes the diode to conduct and provides light to trigger the control triac 57 into conduction. The resistor 72 and capacitor 71 provide filtering to prevent unwanted noise triggering. When the triac 57 conducts, current flows between line 52 and line 59 through the load and first switch. As is well-known, this conduction can occur over selected portions of the AC cycle thereby providing, for instance, dimming to a light bulb connected between the lines 59 and 60.

The transceiver 20 receives signals from the power lines 52 through the inductor 41 and capacitor 62, and transmits signals through the capacitors 63, 62 and the inductor 41. Inductor 64 is coupled to the power supply common connection 61, and this common connection is coupled by capacitors 65 and 66 to the lines 52 and 60, respectively. The transmit line is also clamped to prevent excursion above the potential $V_A$ through the diode 67. The coupling of the receive and transmit signals to and from the power line is a known configuration used to facilitate the high frequency communication signals, substantially without interference from the 60 Hz power signal. In one embodiment, the transceiver 20 is a commercially available transceiver from Echelon Corporation specifically the PLT 21 power line transceiver. Additionally, the power supply discussed above and the coupling of the transceiver to the power lines is discussed in the "PLT 21 Power Line Transceiver User's Guide".

The cell 21 may be a microprocessor or controller program to perform the functions described below or may be an intelligent cell known as a Neuron® chip. Such cells are available from Motorola, part no. MC143120B1DW. These cells can be programmed to perform the functions described in this application.

Sensing Circuit

The state of a first switch connected to line 59 is sensed on line 70 through the resistor 74. This resistor couples the line 59 to one input terminal of the cell 21. As will be seen, the potential on this line is, in effect, compared with the potential (reference signal) connected to another input terminal of cell 21 on line 69. Line 69 is coupled to line 52 through the resistor 73.

Internal to the cell 21, lines 69 and 70 are clamped by diodes between the common connection 61 and $V_{DD}$. This prevents the excursion of these reference signals from exceeding in the positive direction, $V_{DD}$ plus a diode drop, and in the negative direction the potential on line 61 less a diode drop. The reference signal on line 69 (when clamped) is shown along axis 80 of FIG. 3. As can be seen, the reference signal on line 80 after clamping is approximately a square-wave with a period equal to the period of the 60 Hz power frequency.

At first glance, it would appear that line 59, when the triac is not conducting, is completely floating. However, this line is coupled to the power line through resistor 72 and capacitor 71. Consequently, the signal on line 70 (sense signal) has effectively three different steady states; one when the first switch is open, a second when the first switch is closed and the triac is conducting, and a third when the first switch is closed and the triac is off. These are shown on the axes 82a, 82b and 82c, respectively, of FIG. 3. The waveforms associated with varying degrees of partial conduction of the triac are not illustrated. Moreover, the waveform on axis 82b is for triac conduction slightly less than 100% of the time.

As can be seen from the waveform of axis 82a, the sense signal for the open first switch, substantially follows the reference signal on axis 80. When the first switch is closed and the triac is not conducting, as seen on axis 82c, there is a phase shift in the sense signal. Note the positive-to-negative transition of the sense signal is displaced from the positive-to-negative transition of the reference signal. Finally, for the case when the first switch is closed and the triac is conducting, as seen on axis 82b, there is a period of time following positive-to-negative transitions of the reference signal that the sense signal remains positive. During the period 83, the signal is not well defined for purposes of detection.

Figure 3:
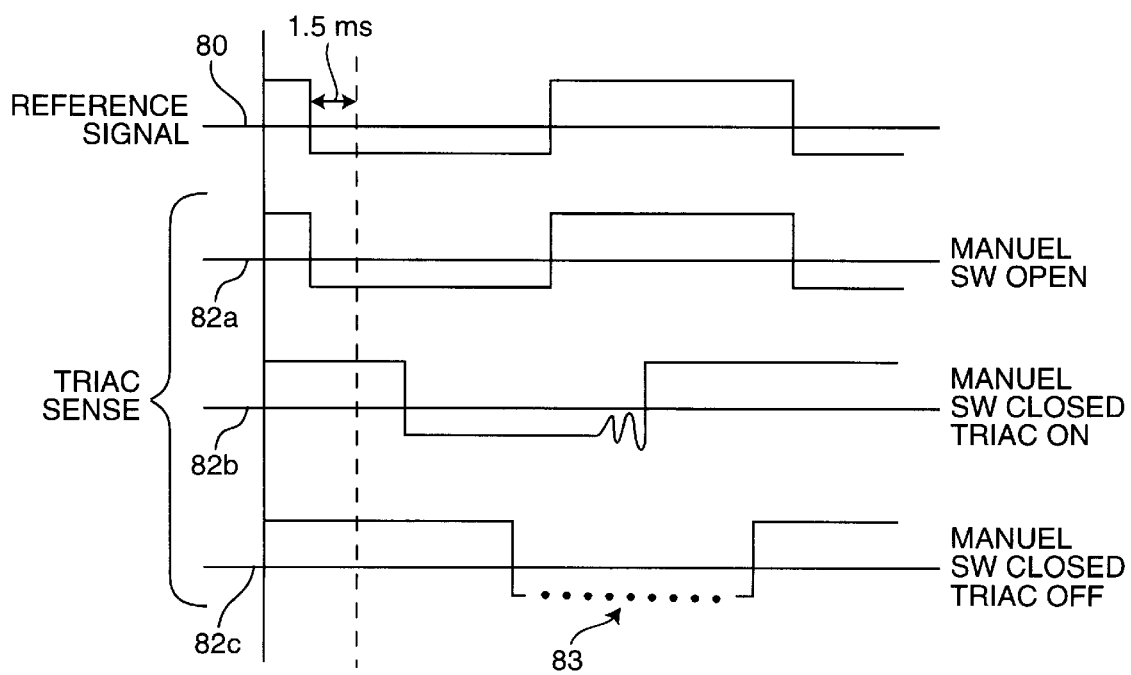
FIG. 3 is a diagram of a plurality of waveforms used to describe the operation of one embodiment of a sensing circuit.

Referring to FIG. 3, if one examines the period after the reference signal transitions from positive-to-negative, it can be seen that the sense signal is high when the first switch is closed, and low when the first switch is open. During the first 1.5 milliseconds following positive-to-negative transitions of the reference signal, cell 71 examines the state of the sense signal. If both are low, the first switch is determined to be open. (Compare the waveforms on axes 80 and 82a during the 1.5 millisecond period.) On the other hand, if the reference signal is low and the sense signal is high during this period it is known that the first switch is closed. (Compare the waveform on axis 80 with the waveforms on axes 82b and 82c during the 1.5 millisecond period.)

Thus, with the addition of two resistors (73 and 74) to the prior art power supply of FIG. 4, sufficient information is obtained to permit a determination of the state (open or closed) of a first switch.

The waveforms of FIG. 3 were obtained using a 100 watt bulb as the load. Similar results can be achieved with other wattage bulbs.

The sensing circuit of FIG. 4 operates in part because of relative movement of the potential between common connection 61 and the neutral line 60 resulting from the conduction of alternate dioded pairs of bridge rectifier 45. If another power supply topology is used then other circuits can be used to sense the state of the first switch. Additionally, the sensing of the state of the first switch, in some cases, will be dependent upon the type of load (e.g., inductive load) which may cause shifts in waveforms and require examination of the sense signal at different periods of time or require a signal to be sensed from different points in the module.

The modules described above may also be used to report their status (e.g., first switch open/closed) to a central monitoring device that, for instance, displays the status information. Then, by way of example, one can monitor which lights or other appliances are on or off. Note if a load is absent (e.g., bulb burned out) this can also be displayed in some cases.

Thus, a module has been described for interconnecting between AC power lines and a load which includes a first switch. The module is able to sense the state of the first switch and thereby control power to the load and to other loads connected to other modules.

We claim:

1. A module for interconnecting between an alternating current (AC) source and an electrical load having a first switch connected in series with the load, comprising:

an electrically controlled switching device coupled to control the flow of AC from the source through the load and first switch;

a control circuit for controlling the switching device;

a sensing circuit coupled to the control circuit for sensing states of the first switch such that the state of the first switch is sensed and used to control the switching device; and a transceiver coupled to the control circuit and the AC source for transmitting signals representing the states of the first switch and for receiving signals from other of the modules indicating the state of another first switch associated with the other of the modules for controlling the switching device based on the state of the other first switch.

2. The module defined by claim 1 wherein the first switch is a manual switch.

3. The module defined by claim 1 wherein the first switch and switching device are in series with the load.

4. The module defined by claims 2 or 3 wherein the switching device is a triac.

5. The module defined by claim 4 wherein the control circuit causes the triac to conduct for less than a full cycle of the AC when the state of the switch has changed state more than once.

* * * * *